April 7, 1970

E. MASSANO 3,505,599

A.C. POWER METER COMPENSATED FOR NONLINEAR RECTIFIER

Filed Nov. 21, 1966

INVENTOR.
ETTORE MASSANO

BY

ATTY.

United States Patent Office 3,505,599
Patented Apr. 7, 1970

3,505,599
A.C. POWER METER COMPENSATED FOR NONLINEAR RECTIFIER
Ettore Massano, Milan, Italy, assignor to Automatic Electric Laboratories, Inc., a corporation of Delaware
Filed Nov. 21, 1966, Ser. No. 595,692
Int. Cl. G01r 17/00, 19/22
U.S. Cl. 324—98        2 Claims

ABSTRACT OF THE DISCLOSURE

An attenuator circuit of a type of A.C. power meter using a rectifier has auxiliary voltage inserting circuits to compensate for nonlinear characteristics of a preceding diode rectifier. The voltage inserting circuits are controlled in unison with an attenuator control means to provide at two points in the attenuator circuit different required compensating voltages for different ranges of the power meter.

---

This invention relates to power meters and more particularly to a type of power meter system that measures the power of an A.C. signal source by comparing its voltage with that of a known reference.

As an aid in the understanding of the instant invention, reference will now be made to the power meter system shown in FIG. 1 of the accompanying drawings. The operation thereof is as follows:

Voltage $Va$ which emanates from generator G, representing the source whose power output it is desired to measure, is detected and rectified at diode D, the rectified voltage is amplified at A and, at the output of the attenuators AT1, AT2, and AT3, the voltage $Vu$ is applied to the input of the oscilloscope O by a chopper switch CS which alternately applies, the voltage $E_o$ of the reference D.C. voltage source B to oscilloscope O.

Thus, two horizontal sweeps will appear on the oscilloscope, the one due to the voltage $Vu$ and the other due to the voltage $E_o$. When the two sweeps are in agreement it will be obvious that $Vu=E_o$. If the characteristic of the detector, i.e. output D.C. voltage $Vcc$–input A.C. voltage $Va$, were a straight line going through zero, i.e., if $$Vcc = KVa$$

where K is a proportionality constant, the device shown in FIG. 1 would be capable of measuring the level of the voltage $Va$. In fact, once the minimum magnitude ($Vam$) of the voltage to be measured is established, there will be, by designation as $Vcm$ the D.C. voltage $Vcc$ corresponding to $Vam$, the relation $Vcm=KVam$. By selecting the reference voltage $E_o$ equal to $Vcm$ when a general voltage $Va$ is applied, and by controlling the attenuators $AT_1$ to $AT_3$ so as to annul the error voltage to provide the condition $Vu=E_o$, the following will be true:

$$KVa \cdot \alpha = E_o$$

where $\alpha$ is the attenuation provided by the attenuators $AT_1$ to $AT_3$, and it follows then that:

$$Va = KE_o/\alpha$$

Now, since K and $E_o$ are constants, the reading of the attenuation $\alpha$ at the attenuator $AT_1$ to $AT_3$ should indicate directly the magnitude of $Va$.

Expressed in terms of logarithms we have moreover:

$$\log Va = \log KE_o - \log \alpha$$

This last relation stating that the calibration of the attenuators can be made directly in terms of db or even dbm.

Unfortunately, however, the detection characteristic of the diodes is not linear; it tends to become linear only for signals having a relatively high amplitude, whereas for very weak signals a quadratic characteristic is obtained if the resistance on the D.C. side is very high as compared with the differential resistance of the diode at the operating point. If in addition the diode is loaded with lower resistances, its characteristic for weak signals becomes of the following type:

$$Vc = KVa^n$$

where $n > 2$ and increasing with decreasing output resistance.

Therefore, if the diagram in FIG. 1 were applied with conventional diodes an accurate reading of the power could be obtained only for a single magnitude of $Va$.

It is possible to compensate for this nonlinearity by devising special attenuators which would take into account the curvature of the detection characteristic of the diode, however, this solution suffers from disadvantages of its own, namely: the cost and complexity of the attenuators, the impossibility of using like components for each attenuator step, and the fact that different attenuators would be required for each diode specie since the detection characteristics thereof are not the same.

It is therefore a primary object of this invention to provide an improved power meter system of the above-mentioned type which permits, in a simple manner, the power reading to be digitally read from the dials of the attenuators used therein.

Briefly, a preferred embodiment of a power meter system according to the invention comprises a detector diode whose output is connected to a D.C. amplifier and into which is fed an A.C. signal whose power is to be ascertained; a plurality of controllable attenuators which are calibrated to correspond to attenuator steps of different orders of magnitude, connected in series to the output of the D.C. amplifiers; a first and second auxiliary D.C. voltage source to compensate for the nonlinearity of the detecting characteristic of the diode, ganged for unicontrol with the attenuator of the highest order of magnitude, the first auxiliary D.C. voltage source being connected prior to the attenuator of the highest order of magnitude and the second D.C. voltage source being connected subsequent to all attenuators; a D.C. reference voltage source; and a device adapted to compare the D.C. output voltage with the D.C. reference voltage.

Other objects and features of the present invention will become more apparent by reference to the following description taken in conjunction with the accompanying drawings, of which:

Figure 1:
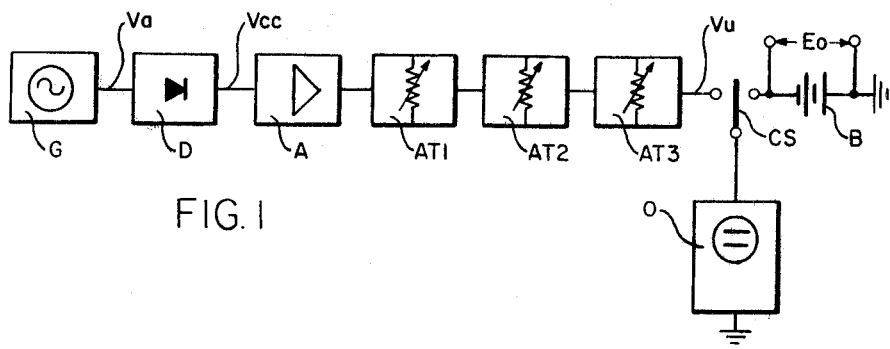
FIG. 1 shows a block diagram of a power meter system, of the type disclosed herein. It will be noted that this diagram has been used above to explain the operation and shortcomings of this type of system, thus no further detailed explanation thereof will be given.
Figure 2:
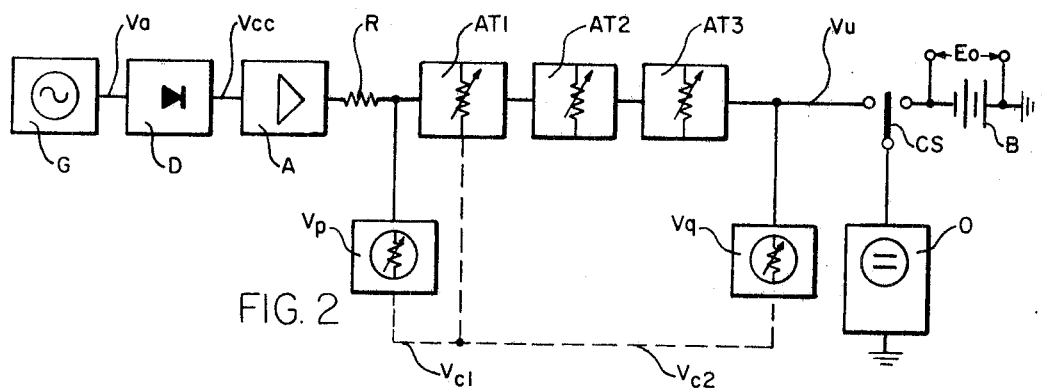
FIG. 2 illustrate a block diagram of a preferred embodiment of a power meter system according to the invention.

Referring now to FIG. 2 of the drawings, it can be seen that the power meter system shown therein differs from the one shown in FIG. 1 in that two auxiliary D.C. voltage sources $V_p$ and $V_q$ have been provided; the first, $V_p$, being coupled to the circuit prior to the attenuators $AT_1$ to $AT_3$, i.e., intermediate the otuput of amplifier A and attenuator $AT_1$, the second $V_q$, being coupled into the circuit following all of the attenuators, i.e., intermediate attenuators $AT_3$ and the output thereof and both being ganged for common control with the attenuator, $AT_1$, of the highest order of magnitude, as illustrated by lines VC1 and VC2, respectively.

Figure 3:
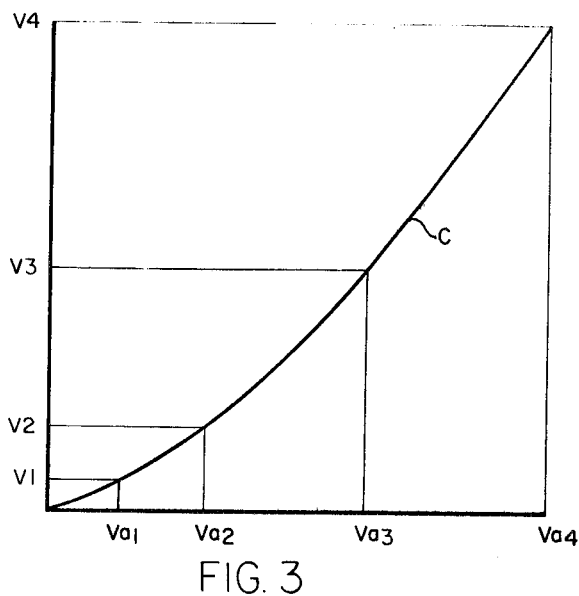
FIG. 3 shows a graph which illustrates the operation of the power meter system of FIG. 2, and FIG. 4 describes a schematic diagram of the power meter system of FIG. 2.

The magnitudes of auxiliary voltages $V_p$ and $V_q$ are variable and have been determined by dividing the detection characteristic curve of the diode 11 into a plurality of ranges, each of 10 db, as shown by the graph of FIG. 3; thus through the provision of these auxiliary voltages, the reading for each range will be accurate at the ends or at two inner points so as to minimize the absolute magnitude of the error.

Looking more closely at the graph of FIG. 3, it can be shown, by way of example, that the detector characteristic C of the diode D has been divided into ranges corresponding to variations in the input voltage $Va$ represented by segments VA1, VA2, VA3 and VA4, beginning with the minimum voltage to be measured, each, as mentioned above, of 10 db. It would be possible, however, to provide finer divisions, such as 5 db, if necessary for a greater degree of accuracy.

Each of these voltage segments, VA1 to VA4, because of the curved output characteristic of the diode detector, do not have the same ratio as that of the preceding voltage segment, but by choosing $V_p$ and $V_q$ correctly for each range, the power reading can be made accurate at the ends thereof.

Thus, for the power meter arrangement of FIG. 2, the voltage $Vu$ at the output of attenuators AT1 to AT3 is expressed by the following relation:

$$Vu = \frac{\alpha}{2}(V+V_p) + \frac{V_q}{2}$$

The factor ½ appearing in the above relation is due to the fact that the attenuators which are of the constant characteristic impedance type, are matched at the input and output of the resistance R and therefore a loss in the amount of 6 db results. This is true even for an attenuation ($\alpha$) equal to 1.

If it is desired to obtain the coincidence at the ends of the range $Va_1$ to $Va_2$, keeping in mind that for $Va_1$, the attention ($\alpha$) is 1, and for $Va_2$, if $Va_2 = \alpha Va_1$, $a = 0.316$ the following two relations can be written:

$$Vu = \frac{1}{2}(V_1 + V_p) + \frac{V_q}{2} = E_o$$

$$Vu = \frac{0.316}{2}(V_2 + V_p) + \frac{V_q}{2} = E_o$$

From these relations the required $V_p$ and $V_q$ magnitudes are readily obtainable; they are:

$$V_q = \frac{0.316 V_2 - V_1}{1 - 0.316}$$

$$V_q = 2E_o - \frac{\alpha}{1-\alpha}(V_2 - V_1)$$

For the second range $Va_2$ to $Va_3$, the magnitude of $V_p$ and $V_q$ are different from those indicated above, in fact by designating as $\alpha_3$ and $\alpha_2$ the attenuations which must be introduced at the voltages $Va_3$ and $Va_2$, there are obtained the following relations:

$$\frac{\alpha_2}{2}(V_2 + V_p) + \frac{V_q}{2} = E_o$$

$$\frac{\alpha_3}{2}(V_3 + V_p) + \frac{V_q}{2} = E_o$$

and from these relations it can be shown that:

$$V_p = \frac{\alpha_3 V_3 - \alpha_2 V_2}{\alpha_2 - \alpha_3}$$

$$V_q = 2E_o - \frac{\alpha_2 \alpha_3}{\alpha_2 - \alpha_3}(V_3 - V_2)$$

Similar expressions can be obtained for the segment $Va_3$ to $Va_4$.

From an inspection of the Expressions 1 and 2 above, the following can be shown to be true:

(1) There are no limitations in the choice of the voltage $E_o$. This can take any magnitude, it can even be $E_o = 0$, or a magnitude can be chosen such as to annul the auxiliary voltage $V_q$ at least in one of the segments of the curve of FIG. 3. The particular magnitude of $E_o$ which annuls $V_q$ is obtained from the relation (2). For the general sections included between $Va_m$ and $Va_{n+1}$ $$E_o = \frac{\alpha_n \cdot \alpha_{n+1}}{\alpha_n - \alpha_{n+1}}(V_{n+1} - V_n)$$

(2) While the auxiliary voltage $V_q$ must be subsequent to all attenuators, the voltage $V_p$ must not necessarily be prior to all attenuators, it must only be prior to the attenuators which do not control its magnitude.

In the described embodiment of the power meter as mentioned above, the entire useful range has been divided into three smaller ranges, each corresponding to a variation of 10 db. Practically these ranges are: −10 dbm to 0 dbm, 0 dbm to +10 dbm and +10 dbm to +20 dbm. The three attenuators $AT_1$, $AT_2$ and $AT_3$ are of the decade type, and have 10 db, 1 db and 0.1 db steps respectively.

The change-over from one segment of the curve to another is achieved by operating the first attenuator which switches the auxiliary voltages $V_p$ and $V_q$. The voltage $V_p$ can also be coupled between AT1 and AT2, however, in this case the attenuation provided by AT1 must be taken into consideration. The voltage $V_p$ cannot however be coupled between AT2 and AT3 because this would not correspond to the mathematical formulation as shown. It should be noted too that the auxiliary voltages $V_p$ and $V_q$ can be obtained both from current and voltage generators.

While the present type of system may be used in many situations where power is to be ascertained, it is especially useful for measuring power in the transmitter or receiver of a radio system.

Referring once again to FIG. 2 of the drawings, an explanation of the operation of the circuit disclosed therein will now be given:

First, attenuator AT1 is adjusted until the two horizontal sweeps on the screen of oscilloscope O, representing the voltages $Vu$ and $Eo$, respectively, are brought as close to each other as possible. By the adjustment of the setting of attenuator AT1, a corresponding predetermined amount of voltage from the auxiliary D.C. voltage sources is applied to the system to compensate for the nonlinearity of diode rectifier D. The setting of AT1 and, consequently, the amount of auxiliary voltage applied to the system depends upon the range in which the voltage of the A.C. signal source falls, as shown by the graph of FIG. 3. Next, the attenuator AT2 is operated to bring the two sweeps further into agreement, and finally by operating the attenuator AT3, the sweeps are brought into fine adjustment. It will be noted that when attenuators AT2 and AT3 are operated, no change in auxiliary voltage sources occurs. These auxiliary voltage sources are operated solely by attenuator AT1.

If the voltage of the generator G has one of the values $Va_1$, $Va_2$, $Va_3$, or $Va_4$, the two sweeps can be brought to coincidence and in such a case the error in the power reading will be zero. If the voltage of the generator G has values intermediate those mentioned above, the magnitude will be further from the values of $Va_1$, $Va_2$, $Va_3$, and $Va_4$, and consequently, a greater error will be prevalent. The greater the number of ranges or segments into which the detection characteristic of the diode is divided, the less the error.

Since the attenuators are of the decade type, they can be calibrated directly in terms of power, the attenuator of the highest order indicating the significant digit of the highest order and the subsequent attenuators indicating in sequence the significant digits of sequentially decreasing order.

Figure 4:
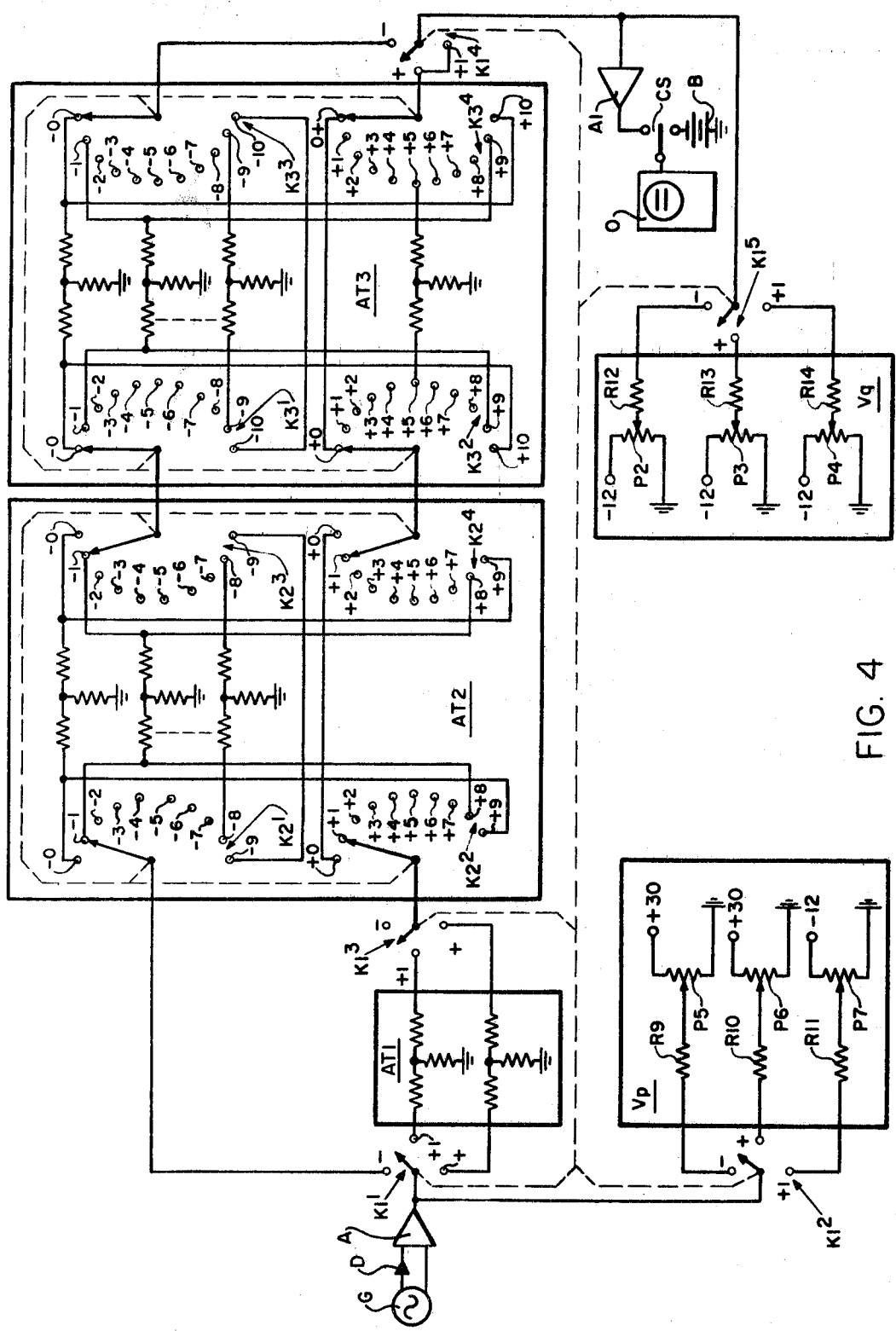

Turning to FIG. 4 of the drawings, there is shown a schematic diagram of the embodiment of the power system of FIG. 2, adapted to measure power from −10 dbm. to +20 dbm. Beginning at the left of FIG. 4, there can be seen the A.C. signal source, represented by generator G, whose power is to be ascertained, and serially connected thereto is diode D which serves to rectify the A.C. voltage eminating from generator G. After passing through a D.C. amplifier A, the rectified voltage is attenuated by means of attenuators AT1, AT2, and AT3. The amount of attenuation provided by attenuator AT1 is determined by the movement of the dials designated K1 which are ganged together for common control; for example, if a negative amount of attenuation is required, dials K1 are turned to the negative (−) position. In this position, attenuator AT1 is by-passed and a connection to attenuator AT2 is effected. If, however, the K1 dials are moved to the position (+) or plus one (+1) position, attenuation will be provided by attenuator AT1 as shown. Also connected to dials K1 are auxiliary voltage sources $V_p$ and $V_q$. As can be seen, a predetermined amount of auxiliary voltage will be applied to the system depending upon the setting of dials K1. The voltage from these auxiliary sources, as already mentioned, is provided to compensate for the nonlinearity of the output characteristic of the diode D. If the K1 dials were, for example, set to the negative (−) position, as mentioned above, auxiliary voltage source $V_p$ would apply, through resistors R9 and potentiometer P5, a voltage somewhere between +30 volts and ground potential, depending upon the values of the resistances shown. If the K1 dials were set to the positive (+) position or the plus one (+1) position, a different, pre-determined value of auxiliary voltage, $V_p$, would be applied to the system at a point prior to attenuator AT1. Likewise, when the K1 dials are positioned to one of these settings a pre-determined value of voltage from auxiliary voltage source $V_q$ is applied to the system at the output of attenuator AT3; for example, when the K1 dials are in the negative (−) position, a voltage between −12 volts and ground potential is supplied, depending upon the chosen values of resistance R12 and potentiometer P2.

Continuing along, it can be seen that both attenuators AT2 and AT3 have a plurality of dials designated K2 and K3, respectively. If the setting of the K1 dials is to the negative (−) position, attenuators AT2 and AT3 will be capable of supplying, through dials $K2^1$, $K2^3$ and $K3^1$ and $K3^3$, respectively, negative attenuation, and if the setting of the K1 dials is to either the positive (+) or the plus one (+1) position, positive attenuation will be supplied by attenuators AT2 and AT3, through dials $K2^2$, $K2^4$ and $K3^2$, $K3^4$, respectively.

In this particular diagram, a D.C. amplifier, A1 is shown connected to the output of attenuator AT3, and the attenuated output voltage from this amplifier is compared finally by means of chopper switch CS on oscilloscope O against a reference voltage from D.C. source B shown in the lower right corner of FIG. 4.

Thus, in summation, an A.C. voltage, the power of which is to be ascertained, is rectified by means of a nonlinear diode D, and then amplified by a D.C. amplifier A. At this point two waves will appear on oscilloscope O, one being the D.C. output voltage from amplifier A1, and the other being the reference voltage from D.C. source B. Through the manipulation of the dials of attenuators AT1, AT2, and AT3, the waves on oscilloscope O are brought into close agreement, and because of the addition of the proper amount of attenuation and a corresponding, predetermined amount of auxiliary voltage to compensate for the nonlinearity of diode D, a direct power reading can be taken from the dials of the attenuators.

While only a preferred embodiment of the invention has been illustrated, it is obvious that numerous modifications and changes could be made without departing from the scope of the invention as claimed.

What is claimed is:

1. A system for measuring the power of a source of A.C. signal, comprising:

rectifying means having nonlinear characteristics connected to said source, a group of serially connected attenuators, the first attenuator of said group having an input terminal connected to said rectifying means, measuring means for observing a predetermined D.C. voltage level, the last attenuator of said group having an output terminal connected to said measuring means, each of said attenuators having control means calibrated in steps, said control means providing readings in descending order of magnitude from said first attenuator to said last attenuator, said attenuators being adjustable to provide said predetermined voltage reading on said D.C. voltage measuring means and thereby without compensation to provide on said calibrated control means a correct reading of D.C. power applied to said input terminal, a first source of adjustable auxiliary D.C. voltage, control means of said source ganged with the control means of said first attenuator, said control means of said first source being operable to select different predetermined compensating voltages, said first source of D.C. voltage being connected to a selected one of said attenuators to add to its output voltage derived from said A.C. signal said predetermined compensating voltage according to the position of said control means of said first attenuator, the compensating voltage having the required value to compensate for the nonlinearity of said rectifying means within its range of operation for each position of said control means of said first attenuator.

2. A system for measuring the power of a source of A.C. signal as claimed in claim 1 wherein said first source of D.C. voltage is connected to the input of one of said attenuators, a second source of auxiliary D.C. voltage connected to said output terminal, control means for said second source also ganged with the control means of said first attenuator, said second source having a predetermined compensating voltage according to the position of the control means of said first attenuator, and the combined effect of the compensating voltages of said first and second auxiliary D.C. sources compensating for the nonlinearity of said rectifying means.

References Cited

UNITED STATES PATENTS

| 2,775,704 | 5/1956 | Gilbert | 324—98 XR |
| 2,872,643 | 2/1959 | Rockwell | 324—119 |
| 3,252,080 | 5/1966 | Newbold et al. | 324—98 XR |
| 3,307,103 | 2/1967 | Heidenreich | 324—98 XR |

RUDOLPH V. ROLINEC, Primary Examiner

E. F. KARLSEN, Assistant Examiner

U.S. Cl. X.R.

323—74; 324—119